United States Patent
Glen

(10) Patent No.: US 8,830,393 B2
(45) Date of Patent: Sep. 9, 2014

(54) METHOD, APPARATUS AND MACHINE-READABLE MEDIUM FOR HANDLING INTERPOLATED VIDEO CONTENT

(75) Inventor: David Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 936 days.

(21) Appl. No.: 12/338,386

(22) Filed: Dec. 18, 2008

(65) Prior Publication Data

US 2009/0161009 A1 Jun. 25, 2009

Related U.S. Application Data

(60) Provisional application No. 61/015,307, filed on Dec. 20, 2007.

(51) Int. Cl.
*H04N 7/01* (2006.01)
*H04N 11/20* (2006.01)

(52) U.S. Cl.
CPC .............. *H04N 7/012* (2013.01); *H04N 7/0127* (2013.01); *H04N 7/0147* (2013.01)
USPC ........... 348/441; 348/443; 348/446; 348/448; 348/449; 348/451; 348/452; 348/456; 348/458; 348/460; 348/473; 348/474; 348/490; 348/407.1; 348/412.1; 348/415.1; 348/430.1; 348/431.1; 348/439.1; 348/513; 348/526; 348/538; 348/559; 348/558; 348/575; 348/620; 348/636; 348/656; 348/669; 348/670; 348/680; 348/693; 348/305; 348/317; 348/333.3; 348/333.4; 348/352; 348/14.15; 348/154; 348/155; 348/220.1; 348/700; 386/232; 382/236; 382/300

(58) Field of Classification Search
USPC ......... 348/441, 443, 448, 458, 558, 446, 449, 348/451, 452, 456, 460, 473, 474, 490, 348/407.1, 412.1, 415.1, 430.1, 431.1, 348/439.1, 513, 526, 538, 559, 575, 620, 348/636, 656, 669, 670, 680, 693, 305, 317, 348/333.3, 333.4, 352, 14.15, 154, 155, 348/220.1, 700; 386/232, 233; 382/236
See application file for complete search history.

(56) References Cited

U.S. PATENT DOCUMENTS 4,792,974 A 12/1988 Chance
5,828,786 A * 10/1998 Rao et al. ............... 382/236

(Continued)

FOREIGN PATENT DOCUMENTS

CN 1815606 8/2006
EP 1328125 7/2003

(Continued)

OTHER PUBLICATIONS

HDMI Transport Specification; TXH Blackbird; Mar. 9, 2006; pp. 1-31.

(Continued)

*Primary Examiner* — Jefferey Harold
*Assistant Examiner* — Mustafizur Rahman
(74) *Attorney, Agent, or Firm* — Faegre Baker Daniels LLP

(57) ABSTRACT

Spatial or temporal interpolation may be performed upon source video content to create interpolated video content. A video signal including the interpolated video content and non-interpolated video content (e.g. the source video content) may be generated. At least one indicator for distinguishing the non-interpolated video content from the interpolated video content may also be generated. The video signal and indicator(s) may be passed from a video source device to a video sink device. The received indicator(s) may be used to distinguish the non-interpolated video content from the interpolated video content in the received video signal. The non-interpolated video content may be used to "redo" the interpolation or may be recorded to a storage medium.

24 Claims, 10 Drawing Sheets

(56) References Cited

U.S. PATENT DOCUMENTS

| | | | |
|---|---|---|---|
| 5,852,472 A | 12/1998 | Prasad et al. | |
| 5,960,081 A * | 9/1999 | Vynne et al. | 713/176 |
| 6,314,479 B1 | 11/2001 | Frederick et al. | |
| 6,463,445 B1 | 10/2002 | Suzuki et al. | |
| 6,484,128 B1 | 11/2002 | Sekiya | |
| 6,609,251 B1 * | 8/2003 | Yoneda | 725/71 |
| 7,079,128 B2 | 7/2006 | Kim | |
| 7,216,177 B1 | 5/2007 | Strong et al. | |
| 7,256,835 B2 * | 8/2007 | Jiang et al. | 348/448 |
| 7,349,029 B1 * | 3/2008 | Chou | 348/448 |
| 7,355,531 B2 | 4/2008 | Lai et al. | |
| 7,382,364 B2 | 6/2008 | Sasaki | |
| 7,542,618 B2 | 6/2009 | Kang et al. | |
| 7,548,675 B2 | 6/2009 | Tatum et al. | |
| 7,734,143 B2 | 6/2010 | Mizuhashi et al. | |
| 7,929,525 B2 | 4/2011 | Winter et al. | |
| 7,954,131 B2 | 5/2011 | Cholas et al. | |
| 8,117,620 B2 | 2/2012 | Raghunath et al. | |
| 2001/0019365 A1 | 9/2001 | Kim et al. | |
| 2002/0156870 A1 | 10/2002 | Boroumand et al. | |
| 2002/0161844 A1 | 10/2002 | Overtoom | |
| 2003/0191623 A1 | 10/2003 | Salmonsen | |
| 2004/0085283 A1 | 5/2004 | Wang | |
| 2004/0194132 A1 | 9/2004 | Kawashima et al. | |
| 2004/0218599 A1 | 11/2004 | Kobayashi | |
| 2005/0259751 A1 | 11/2005 | Howard et al. | |
| 2005/0270415 A1 * | 12/2005 | Jiang et al. | 348/441 |
| 2006/0056629 A1 | 3/2006 | Adamson et al. | |
| 2006/0066504 A1 * | 3/2006 | Sampsell et al. | 345/1.1 |
| 2006/0067690 A1 | 3/2006 | Tatum et al. | |
| 2006/0077778 A1 | 4/2006 | Tatum et al. | |
| 2006/0140499 A1 | 6/2006 | Kang et al. | |
| 2006/0182422 A1 | 8/2006 | Peng | |
| 2006/0184992 A1 | 8/2006 | Kortum et al. | |
| 2006/0269056 A1 | 11/2006 | Montag | |
| 2007/0058077 A1 * | 3/2007 | Hirai | 348/441 |
| 2007/0186015 A1 | 8/2007 | Taft et al. | |
| 2007/0230578 A1 * | 10/2007 | Shi et al. | 375/240.16 |
| 2007/0268164 A1 | 11/2007 | Lai et al. | |
| 2007/0286246 A1 | 12/2007 | Kobayashi | |
| 2008/0072261 A1 | 3/2008 | Ralston et al. | |
| 2008/0201748 A1 | 8/2008 | Hasek et al. | |
| 2009/0031381 A1 | 1/2009 | Cohen et al. | |
| 2009/0046205 A1 | 2/2009 | Strasser et al. | |
| 2009/0046993 A1 | 2/2009 | Nishio | |
| 2010/0142723 A1 | 6/2010 | Bucklen | |
| 2010/0296558 A1 | 11/2010 | Matsushita et al. | |
| 2011/0026779 A1 | 2/2011 | Matsumoto et al. | |

FOREIGN PATENT DOCUMENTS

| | | |
|---|---|---|
| EP | 1675382 A2 | 6/2006 |
| EP | 1677249 A2 | 7/2006 |
| EP | 1995952 | 11/2008 |
| JP | 2004-126749 | 4/2004 |
| JP | 2006-222958 | 8/2006 |
| JP | 2006-352186 | 12/2006 |
| JP | 2007-043659 | 2/2007 |
| WO | 03073229 | 9/2003 |
| WO | 2007026126 | 3/2007 |
| WO | 2007102413 | 9/2007 |

OTHER PUBLICATIONS

Content Descriptor Definitions; TXH Blackbird; Mar. 9, 2005; pp. 1-46.
International Search Report and Written Opinion mailed Nov. 15, 2011, in PCT Patent Application No. PCT/CA2011/00932.
"HD HQV Benchmark Testing & Scoring Guide", from http:gizmodo.com, Jun. 6, 2007.
EPC Communication pursuant to Article 94(3) dated May 21, 2013, in EP Application No. 08865646.7.
Atala, Jamie Jo., USPTO Communication dated Sep. 7, 2011, in U.S. Appl. No. 12/339,563, filed Dec. 19, 2008.
Atala, Jamie Jo., USPTO Communication dated Feb. 10, 2012, in U.S. Appl. No. 12/339,563, filed Dec. 19, 2008.
Bui, Kieu Oah T, USPTO Communication dated Oct. 14, 2011, in U.S. Appl. No. 11/957,852, filed Dec. 17, 2007.
Bui, Kieu Oah T, USPTO Communication dated Mar. 13, 2012, in U.S. Appl. No. 11/957,852, filed Dec. 17, 2007.
Bui, Kieu Oah T, USPTO Communication dated Sep. 24, 2012, in U.S. Appl. No. 11/957,852, filed Dec. 17, 2007.
Chinese Office Action dated May 31, 2012, in Chinese Application No. 200880126956.9.
Chinese Office Action dated Sep. 18, 2012, in Chinese Application No. 200880126817.6.
Chinese Office Action dated Feb. 4, 2013, in Chinese Patent Application No. 200880127097.5.
Chinese Office Action dated Mar. 8, 2013, in Chinese Application No. 200880126956.9.
Baig, Sahar A., USPTO Communication dated Mar. 18, 2013, in U.S. Appl. No. 12/860,549, filed Aug. 20, 2010.
Baig, Sahar A., Uspto Communication dated Jul. 11, 2012, in U.S. Appl. No. 12/860,549, filed Aug. 20, 2010.
"802.3" posted Dec. 27, 200 on Whatis.com.
Debooer, "Video processing in DVD players, receivers and displays," Audioholics Online A/V Magazine, dated Mar. 25, 2007, from www.audioholics.com.
EPC Communication pursuant to Article 94(3) dated Dec. 20, 2012, in EP Application No. 08861200.7.
European Extended Search Report dated May 24, 2012, in European Application No. 08861200.7.
European Extended Search Report dated Sep. 24, 2012, in European Application No. 08865646.7.
European Extended Search Report dated Jul. 17, 2012, in European Application No. 08862385.5.
HDMI Consortium, "High-Definition Multimedia Interface. Spec 1.1", Version 1.1; May 20, 2004.
HDMI Licensing LLC, "High-definition multimedia interface specification," version 1.3a, Nov. 10, 2006, HDMI Licensing LLC, p. 118-126.
"Universal Plug and Play," posted Jan. 27, 2006, on Whatis.com.
International Search Report and Written Opinion mailed Apr. 15, 2009, in PCT Patent Application No. PCT/CA2008/002187.
International Search Report and Written Opinion mailed Mar. 23, 2009, in PCT Patent Application No. PCT/CA2008/002214.
International Search Report and Written Opinion mailed Apr. 8, 2009, in PCT Patent Application No. PCT/CA2008/002217.
Silva, Robert. "Upscaling DVD Players vs. Upscaling HDTVs," http://hometheather.about.com/od/dvdbasics/qt/dvdhdtvscaling.htm, retrieved: Dec. 21, 2012.
Japanese Office Action dated Jan. 9, 2013, in Japanese Application No. 2010-538290.
Le, Rong, USPTO Communication dated Sep. 27, 2011, in U.S. Appl. No. 11/957,938, filed Dec. 17, 2007.
Le, Rong, USPTO Communication dated Mar. 28, 2012, in U.S. Appl. No. 11/957,938, filed Dec. 17, 2007.
Le, Rong, USPTO Communication dated Sep. 24, 2012, in U.S. Appl. No. 11/957,938, filed Dec. 17, 2007.
Le, Rong, USPTO Communication dated Jun. 6, 2013, in U.S. Appl. No. 11/957,938, filed Dec. 17, 2007.
Nghiem et al., "A new evaluation approach for video processing algorithms", IEEE Workshop on Motion and Video Computing (WMVC'07), Feb. 28, 2007.
Ritchie et al., UPnP AV Architecture:1, Jun. 25, 2002, pp. 1-22, vol. 1.
International Search Report and Written Opinion mailed Feb. 4, 2010, in PCT Patent Application No. PCT/US2009/059162.
Christensen, Scott B., USPTO Communication dated Apr. 28, 2011 in U.S. Appl. No. 12/245,216, filed Oct. 3, 2008.
Christensen, Scott B., USPTO Communication dated Oct. 25, 2011 in U.S. Appl. No. 12/245,216, filed Oct. 3, 2008.

* cited by examiner

METHOD, APPARATUS AND MACHINE-READABLE MEDIUM FOR HANDLING INTERPOLATED VIDEO CONTENT

CROSS REFERENCE TO RELATED APPLICATIONS

This application claims the benefit of U.S. Provisional Application No. 61/015,307 filed on Dec. 20, 2007, the contents of which are hereby incorporated by reference hereinto.

FIELD OF TECHNOLOGY

The present disclosure relates generally to video processing, and more particularly a method, apparatus and machine-readable medium for handling interpolated video content such as spatially or temporally interpolated video content.

BACKGROUND

A video source device is a device, such as a DVD-Video player, High-Density HD-DVD player, Blu-Ray disc player, set-top box or personal computer (PC) for example, that outputs a video signal, which may be intended for use by a display device (e.g. a television) or other downstream component. A video source device may perform various types of video processing upon source video content, e.g. to convert between formats or to improve the quality of video images. One type of video processing that a video source device may perform upon source video content is temporal interpolation. Temporal interpolation generally involves using portions of the source video content, representing at least two points in time (e.g. two video frames within a sequence), in order to interpolate (estimate) content at another point in time, e.g. in between the two. Examples of temporal interpolation video processing include certain types of frame rate conversion and de-interlacing. For clarity, the term "source video content" refers to video content (e.g. video frames or fields) that forms the basis for temporal interpolation performed by the video source device. Such source content may be received, possibly in encoded or compressed form, from a source, such as a satellite, cable television channel, terrestrial broadcast channel, DVD, hard drive, video archive or the like. Source video content is closer to the "true" images recorded by a camera than temporally interpolated video content generated therefrom. An intermediate video processor, such as a DVDO® iScan™ VP50 High Definition audio/video processor from Anchor Bay Technologies for example, is also a form of video source device.

A video sink device is a device, such as an intermediate video processor (which typically lacks display capabilities, e.g. the above-noted DVDO® iScan™ VP50 High Definition audio/video processor), or a display device (e.g. Cathode Ray Tube (CRT), Liquid Crystal Display (LCD), plasma display, Organic Light-Emitting Display (OLED), Digital Light Processing (DLP) display or Liquid Crystal on Silicon (LCOS) display for example), that receives a video signal and either processes the signal in some fashion or displays video images based on the signal. Commonly, a video sink device (e.g. a television) receives a video signal from an interconnected video source device (e.g. a DVD-Video player). The interconnection between the devices may be a cable that may conform to a known industry standard, such as VGA, composite/S-video or component out, Digital Visual Interface (DVI), High-Definition Multimedia Interface™ (HDMI™), DisplayPort®, Digital Flat Panel (DFP) Interface, Open LVDS Display Interface (OpenLDI), or Gigabit Video Interface (GVIF) standard for example. The video source and video sink devices may form part of a home entertainment system for example.

Like the video source device, the video sink device may also be capable of performing temporal interpolation video processing upon a received video signal. The temporal interpolation capabilities of the video sink device may overlap, in whole or in part, with the temporal interpolation capabilities of the upstream video source device. The reason for the overlap may be that the devices are independently marketed as modular components that are capable of interconnection with various types of complementary video source devices or video sink devices, whose temporal interpolation video processing capabilities may vary, or may be non-existent. The quality of the temporal interpolation video processing performed by the video source device may differ significantly from the quality of the temporal interpolation video processing performed by the video sink device, e.g. due to the use of different temporal interpolation algorithms or integrated circuitry by the devices.

From the perspective of a video sink device, a received video signal upon which temporal interpolation video processing has earlier been performed by an upstream video source device may be largely or wholly indistinguishable from a received video signal upon which no temporal interpolation video processing has earlier been performed. Even when it is possible to determine that temporal interpolation video processing has earlier been performed upon the received signal, the processing involved in identifying temporally interpolated video content in the video signal may be complex.

Similar issues may exist when video content is spatially interpolated.

SUMMARY

In one aspect, there is provided a method comprising: interpolating source video content to create interpolated video content; generating a video signal including the interpolated video content and non-interpolated video content; and generating at least one indicator for distinguishing the non-interpolated video content from the interpolated video content in the video signal.

In another aspect, there is provided a method comprising: receiving a video signal comprising non-interpolated video content and interpolated video content; receiving at least one indicator for distinguishing the non-interpolated video content from the interpolated video content in the video signal; and based on the at least one indicator, distinguishing the non-interpolated video content from the interpolated video content in the video signal.

In another aspect, there is provided a machine-readable medium storing instructions that, when executed by a processor of a video source device, causes the device to: interpolate source video content to create interpolated video content; generate a video signal including the interpolated video content and non-interpolated video content; and generate at least one indicator for distinguishing the non-interpolated video content from the interpolated video content in the video signal.

In another aspect, there is provided a machine-readable medium storing instruction that, when executed by a processor of a video sink device, cause the device to: receive a video signal comprising non-interpolated video content and interpolated video content; receive at least one indicator for distinguishing the non-interpolated video content from the interpolated video content in the video signal; and based on the at least one indicator, distinguish the non-interpolated video content from the interpolated video content in the video signal.

In another aspect, there is provided a video source device comprising a processor and memory storing instructions that, when executed by the processor, cause the device to: interpolate source video content to create interpolated video content; generate a video signal including the interpolated video content and non-interpolated video content; and generate at least one indicator for distinguishing the non-interpolated video content from the interpolated video content in the video signal.

In another aspect, there is provided a video sink device comprising a processor and memory storing instructions that, when executed by the processor, cause the device to: receive a video signal comprising non-interpolated video content and interpolated video content; receive at least one indicator for distinguishing the non-interpolated video content from the interpolated video content in the video signal; and based on the at least one indicator, distinguish the non-interpolated video content from the interpolated video content in the video signal.

Other aspects and features of the present disclosure will become apparent to those of ordinary skill in the art upon review of the following description of specific embodiments in conjunction with the accompanying figures.

DETAILED DESCRIPTION

In overview, each of an exemplary video source device and an interconnected video sink device is capable of performing temporal interpolation video processing. When the video source device temporally interpolates source video content, it generates a video signal that is partly made up of temporally interpolated video content and partly made up of non-temporally-interpolated video content (i.e. video content that has not been temporally interpolated). The non-temporally-interpolated video content may for example be the source video content or a processed form of the source video content (e.g. a spatially modified version, such as a noise-reduced, color-enhanced, sharpness-enhanced, and/or scaled version, or possibly even a version that has been temporally processed in a manner not involving frame-rate conversion or other temporal interpolation, such as having been subjected to super-resolution or temporal noise reduction). The video source device also generates one or more indicators for distinguishing the non-temporally-interpolated video content from the temporally interpolated video content the video signal. The indicator(s) are output to the video sink device along with the video signal (e.g. embedded within it). The video device uses the indicator(s) to easily distinguish the non-temporally-interpolated video content from the temporally interpolated video content within the received video signal. The video sink device may thereafter elect to disregard the temporally interpolated video content, instead using the non-temporally-interpolated video content to generate new temporally interpolated video content which may be substituted for the temporally interpolated video content received from the video source device. In this fashion, the video sink device may "redo" the temporal interpolation video processing performed by the video source device. If the temporally interpolated video content that is substituted by the video sink device is of a higher quality than of replaced temporally interpolated video content, then the quality of the resulting video signal may be improved. Alternatively, the video sink device may simply "undo" the temporal interpolation video processing by disregarding the temporally interpolated video content. The non-temporally-interpolated video content may be recorded onto a storage medium (e.g. a hard drive), to efficiently store the video for example. This may be the case when the video sink device has recording capabilities, like a digital video recorder for example.

In another example, the same approach may be used, but for spatial interpolation.

Figure 1:
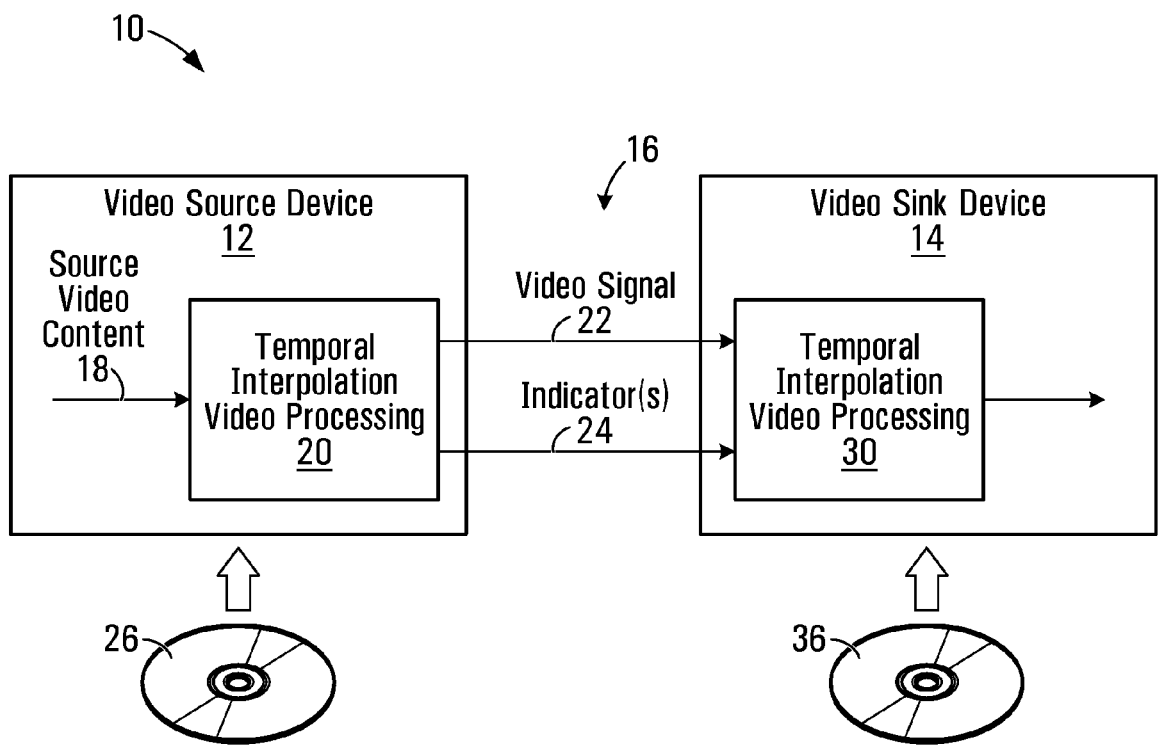
FIG. 1 is a schematic diagram of a system having a video source device and a video sink device.

Referring to FIG. 1, a system 10 includes an exemplary video source device 12 and an exemplary video sink device 14 interconnected by a video interconnection 16.

The video source device 12 is an electronic device that outputs a video signal, comprising frames or fields for example, over interconnection 16. The device 12 may for example be a PC, DVD-Video player, HD-DVD player, Blu-ray disc player, or set-top box receiving source video content 18 (which also may be frames or fields, possibly encoded or compressed) from any of a DVD, hard drive, video archive, telephone line, broadband over power line, Ethernet cable, coaxial cable, satellite dish, or VHF, UHF or HD antenna cable television channel, or the like. As such, the device 12 has at least one processor in communication with machine-readable memory (not illustrated), which may be random access memory or read-only memory for example.

The device 12 includes a functional block 20 for performing temporal interpolation video processing upon source video content 18, as well as other components that are omitted from FIG. 1 for clarity. The functional block 20 may be effected in hardware, software, firmware or combinations of these. The software and/or firmware may be stored, in or may constitute (as appropriate), the above-noted machine-readable memory. The software (if any) may be loaded from a machine-readable medium 26, such as an optical disk, magnetic disk or read only memory chip for example, e.g. during device manufacture, or possibly thereafter. The temporal interpolation that is performed by functional block 20 may be fixed or dynamically configurable, e.g., based on user preference settings.

The video source device 12 has two outputs, namely, video signal 22 and indicators 24. Video signal 22 results from the application of temporal interpolation video processing to the source video content 18. The signal 22 is partly made up of temporally interpolated video content and partly made up of non-temporally-interpolated content 18, as will be described. The indicators 24 are for distinguishing the non-temporally-interpolated video content in the generated video signal 22 from the temporally interpolated video content in the video signal 22. It should be appreciated that, although video signal 22 is illustrated as being distinct from indicators 24 in FIG. 1, they may in fact be combined (e.g. the indicators 24 may be embedded within the video signal 22).

Figure 2:
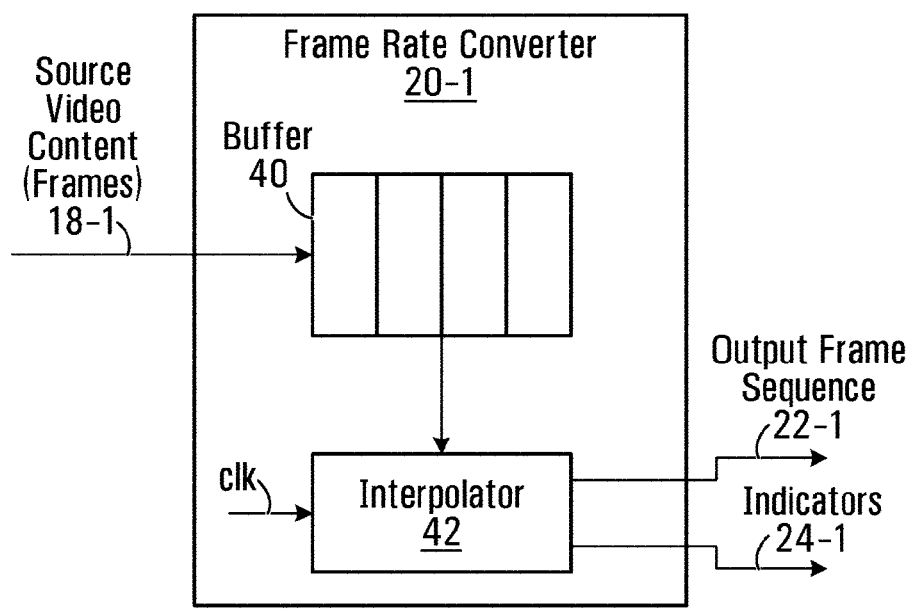
FIG. 2 is a simplified schematic diagram of a temporal interpolation video processing block (a frame rate converter) in one embodiment of the video source device of FIG. 1.
Figure 5:
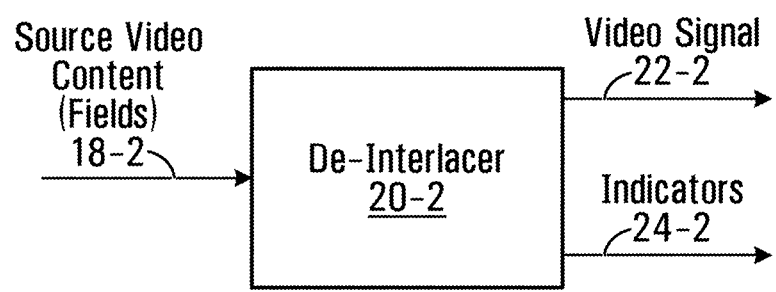
FIG. 5 is a simplified schematic diagram of a temporal interpolation video processing block (a de-interlacer) in another embodiment of the video source device of FIG. 1.

The type of temporal interpolation video processing performed by the functional block 20 may vary from embodiment to embodiment. Two exemplary functional blocks 20-1 and 20-2 that perform different types of temporal interpolation video processing are illustrated in FIGS. 2 and 5, described below.

Video sink device 14 is an electronic device, such as an intermediate video processor (e.g. a DVDO® iScan™ VP50 High Definition audio/video processor) or a display device (e.g. CRT, LCD, LCOS, plasma, OLED or DLP display), that receives video signal 22 from video source device 12 over interconnection 16 and applies further temporal interpolation video processing to (at least a portion of) the video signal 22, as described below. The device 14 accordingly also has at least one processor in communication with machine-readable memory (not illustrated), which may be random access or read-only memory for example. The video processing performed by the device 14 includes temporal interpolation video processing, which is performed by functional block 30. The functional block 30 may be effected in hardware, software, firmware or combinations of these. The software and/or firmware may be stored in, or may constitute, the machine-readable memory with which the processor communicates. The software (if any) may be loaded from a machine-readable medium 36, such as a optical disk, magnetic disk or read only memory chip for example, e.g. during the manufacture of device 14, or thereafter. The temporal interpolation that is performed by functional block 30 may be fixed or dynamically configurable, e.g., based on user preference settings. Components of video sink device 14 other than block 30 are omitted from FIG. 1 for clarity.

The type of temporal interpolation video processing performed by functional block 30 of video sink device 14, and functional block 20 of video source device 12, may vary from embodiment to embodiment. In the embodiments described herein, each of the blocks 20 and 30 performs the same type of temporal interpolation. For example, both blocks 20 and 30 may perform frame-rate conversion (i.e. scan-rate conversion); alternatively, both blocks 20 and 30 may perform a form of de-interlacing involving temporal interpolation. Although not a requirement, in each case described herein, the quality of the temporal interpolation performed by (upstream) block 20 is inferior to that of (downstream) block 30. This may be due to the use of different algorithms or circuitry by blocks 20 and 30 to achieve temporal interpolation video processing. Accordingly, the video sink device engages in processing to perform temporal interpolation video processing upon the non-temporally interpolated video content within the video signal and to "redo" the earlier-performed temporal interpolation video processing by replacing the temporally interpolated video content in the received signal with the newly generated temporally interpolated video content.

Video interconnection 16 is an interconnection for carrying a video signal 22, as well as indicators 24 about the content of the video signal, from the video source device 12 to the video sink device 14. Physically, the interconnection 16 may be an electrical or optical cable, or it may simply be air between the devices 12 and 14 over which video data is wirelessly transmitted. The interconnection 16 may be governed by a proprietary signalling protocol. Alternatively, the interconnection 16 may conform to a known video interconnect standard, such as the DVI, HDMI™, DFP Interface, DisplayPort®, OpenLDI, or GVIF standard for example. In some embodiments, connection 16 may have multiple channels defined therein. The video signal may be carried by a first channel while the indicators are carried by second channel. For example, if the interconnection 16 conforms to the HDMI™ standard, the Consumer Electronics Control (CEC) channel, which is a single-wire, bidirectional, serial bus, and is optionally implemented in HDMI™ interfaces, may be used to carry the indicators 24. If the interconnection 16 conforms to the DVI or HDMI™ standard, the Display Data Channel (DDC) may be used to carry indicators 24. As is known in the art, the DDC is governed by a standard promulgated by the Video Electronics Standards Association (VESA) and governs communication between a sink device and a graphics subsystem. The DDC standard (e.g. the Enhanced Display Data Channel (E-DDC™) Standard, Version 1.1, Mar. 24, 2004), as well as the VESA Enhanced Extended Display Identification Data (E-EDID) Standard (e.g. Release A, 2.0, September, 2006, which defines a minimum 128-byte data structure that may be referred to as the "EDID 1.4" data structure containing information which permits a modern computer to know what kind of monitor is connected to it, including vendor information, maximum image size, color characteristics, factory pre-set timings, frequency range limits, and character strings for the monitor name and serial number), collectively provide a standardized approach whereby a video sink device can inform a video source device about its characteristics, such as maximum resolution and color depth, so as to permit the video source device to cause valid display configuration options to be presented to a user for example. If the interconnection 16 conforms to the DisplayPort® standard, the Auxiliary Channel may be used to carry indicators 24. Alternatively, in some embodiments, the indicators 24 could be sent in-band within the video signal being communicated over the interconnection 16, e.g. multiplexed within vertical or horizontal blanking intervals. In a further alternative, in some embodiments, the signalling protocol could be a protocol used in broadcast transmission of video (e.g. cable, satellite or terrestrial), such as NTSC, PAL, ATSC. Furthermore, it should be recognized that the video carried over interconnection 16 may be uncompressed or compressed.

As noted above, in one example, the functional block 20 comprises a frame-rate converter (FRC). An exemplary FRC 20-1 used by this exemplary embodiment is illustrated in FIG. 2.

As illustrated in FIG. 2, FRC 20-1 includes a buffer 40 and an interpolator 42. Other components of FRC 20-1 are omitted for clarity. FRC 20-1 has a single input, namely source video content 18-1 (exemplary of source video content 18 of FIG. 1), and two outputs, namely output frame sequence 22-1 (exemplary of video signal 22 of FIG. 1) and indicators 24-1 (exemplary of indicators 24 of FIG. 1). The outputs 22-1, 24-1 of interpolator 42 also form the two outputs of the FRC 20-1.

Buffer 40 stores source video content 18-1 for temporal interpolation by interpolator 42. In the illustrated embodiment, the buffer 40 is a first in, first out frame buffer capable of storing four sequential video frames for temporal interpolation. The content 18-1 may for example have been decoded by an upstream video decoder (not expressly illustrated), e.g.

within the video source device 12, so as to create a pixel stream representing a series of frames of a particular resolution. In the present example, the source frames 18-1 are telecine converted frames, i.e. are the result of an earlier conversion of original 24 frames/sec film frames to 60 frames/sec video frames.

Interpolator 42 functions to temporally interpolate source video frames 18-1 in buffer 40 in order to form output frames at a frame rate equal to the frequency of frames arriving at buffer 40 multiplied by a scaling factor. A time-based reference such as a clock signal ("CLK") times the arrival of the frames and allows FRC 20-1 to derive the associated frame rate. In the present embodiment, interpolator 42 forms temporally interpolated frames representative of motion between adjacent original film frames from which the source frames 18-1 were obtained through telecine conversion. The interpolator 42 achieves this by performing the following steps: (1) detecting the cadence of the source video frames 18-1 (which in the present example is indicative of the telecine conversion); (2) based on the cadence, identifying source video frames representative of original film frames; and (3) interpolating based on the identified frames. The result is an output frame sequence 22-1 in which temporally interpolated frames are intermixed with the (non-temporally-interpolated) source video frames 18-1 (as described below). In some embodiments, the non-temporally-interpolated video content within the output frame sequence 22-1 may not be source video frames 18-1 per se, but may rather be a processed form of the source video frames 18-1 (e.g. a noise-reduced, color-enhanced, sharpness-enhanced, and/or scaled version of the source video frames 18-1). Interpolator 42 also generates indicators 24-1 for distinguishing the non-temporally-interpolated video content from the temporally interpolated video content in the generated video signal.

Figure 3:
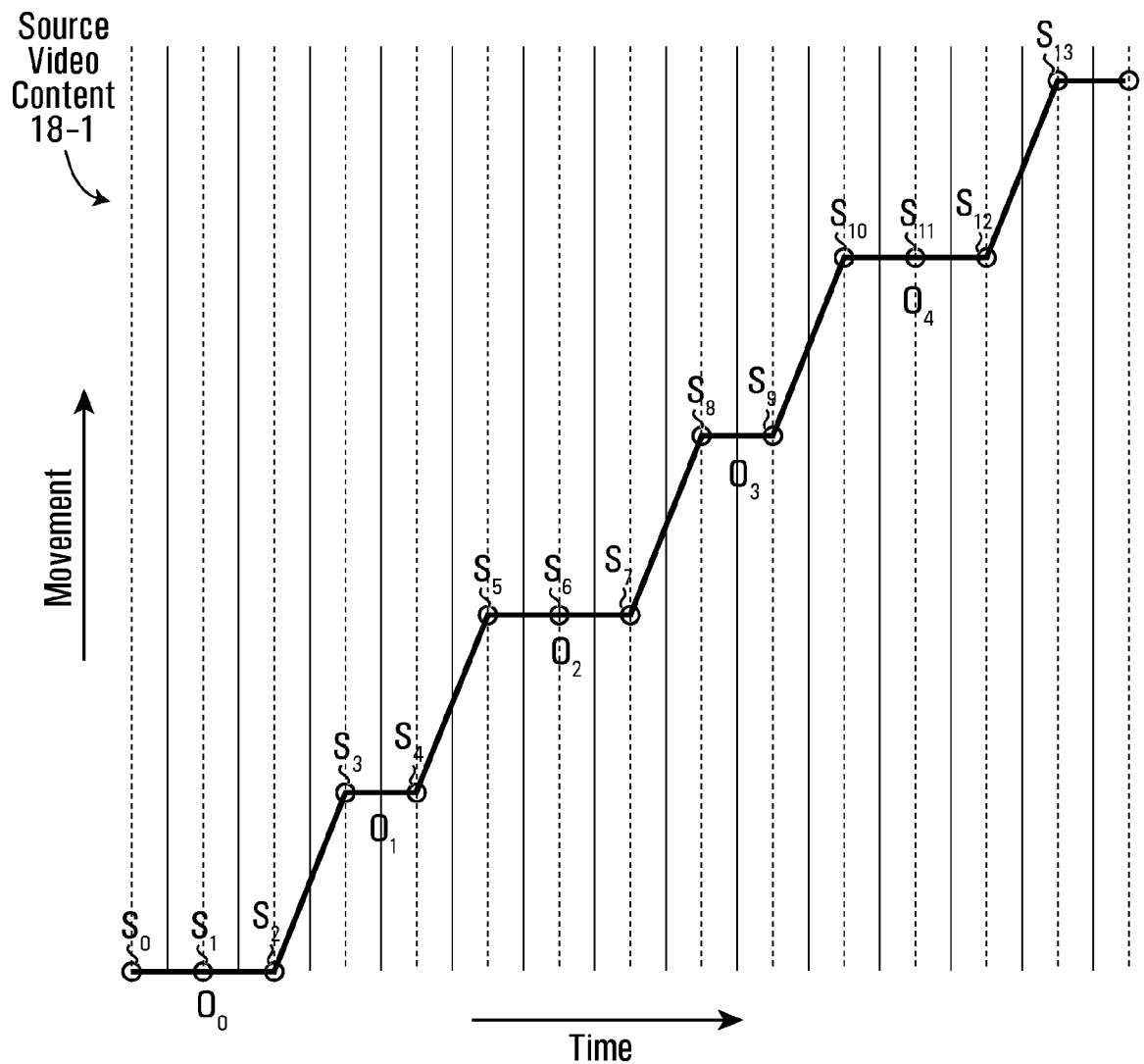
FIG. 3 is a motion graph illustrating a video frame sequence that forms the input to the block of FIG. 2.
Figure 4:
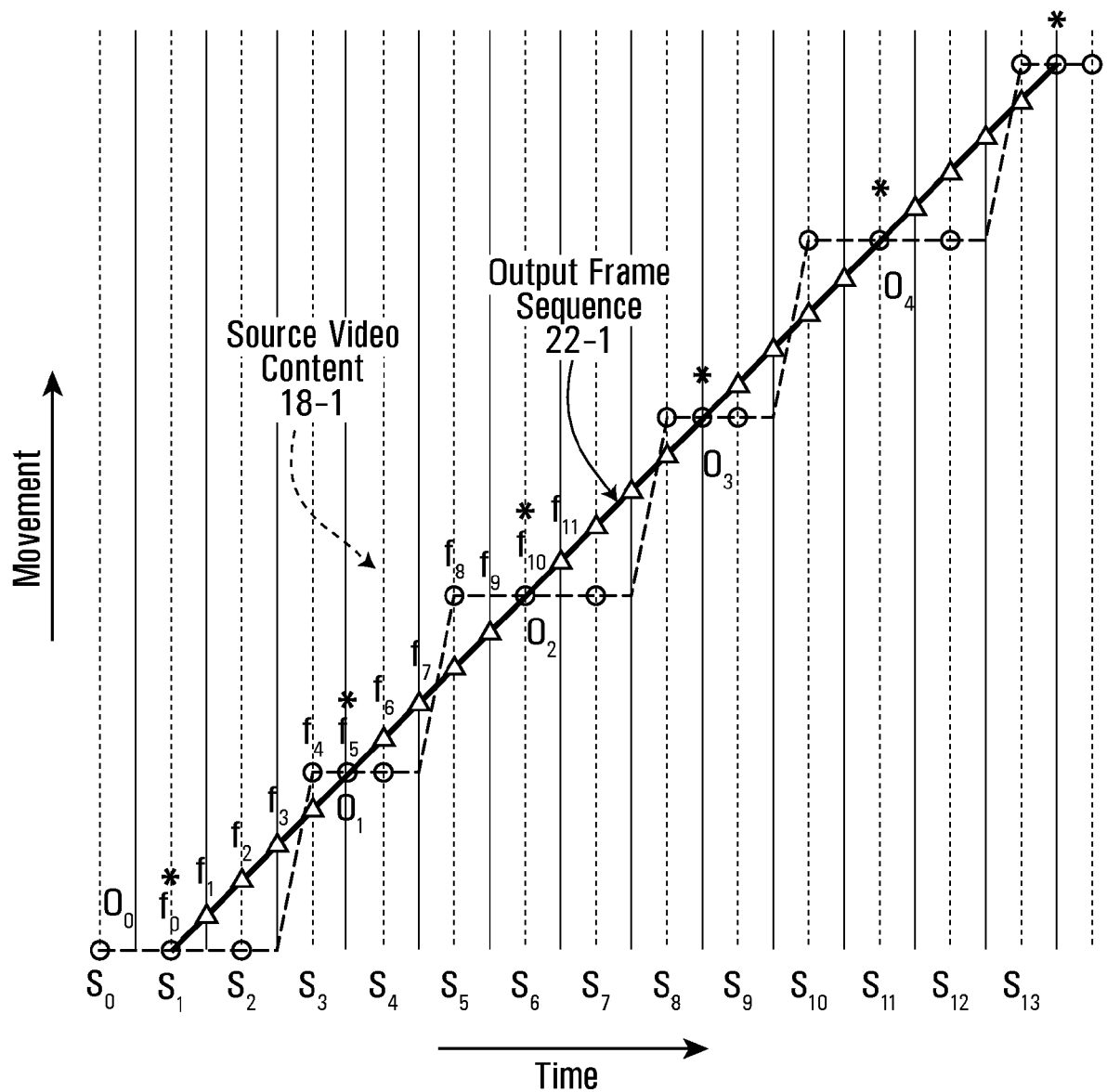
FIG. 4 is a motion graph illustrating the exemplary temporal interpolation video processing performed by the block of FIG. 2 based on the input of FIG. 3.

FIG. 3 is a motion graph illustrating an exemplary source frame sequence 18-1 input by FRC 20-1. FIG. 4 is a graph depicting the relationship between the source video frames 18-1 and output frame sequence 22-1 generated by FRC 20-1. These figures are described below in conjunction with the description of the operation of the system 10.

As noted above, the functional block 20 may alternatively comprise a de-interlacer. The purpose of a de-interlacer is of course to generate video frames from video fields. An exemplary de-interlacer 20-2 used by this exemplary embodiment is illustrated in FIG. 5.

As shown in FIG. 5, the de-interlacer 20-2 has a single input, namely source video content 18-2 (exemplary of source video content 18 of FIG. 1), and two outputs, namely video signal 22-2 (exemplary of video signal 22 of FIG. 1) and indicators 24-2 (exemplary of indicators 24 of FIG. 1). The source video content 18-2 comprises a sequence of video fields. In the depicted embodiment, each video field represents a different moment in time, e.g. interlaced video as might be generated by a video camera. This is in contrast to a sequence of video fields in which adjacent fields may represent the same moment in time, such as when the fields are odd and even (i.e. "top" and "bottom") fields from the same original film frame. The de-interlacer 20-2 of the present embodiment applies temporal interpolation to effectively shift every other field back in time to match the moment in time of the preceding field, and then combines the two fields to create a single frame. The time-shifting is to avoid the problem of "combing", which is when every second horizontal line in a displayed frame does not fit with the intervening lines. The resulting output frame sequence comprises the video signal 22-2 that is output by the de-interlacer 20-2. The de-interlacer also generates and outputs indicators 24-2, which provide an indication of what portion of the output frame sequence 22-2 is source video content 18-2 and what portion is temporally interpolated video content, as will be described.

Figure 6:
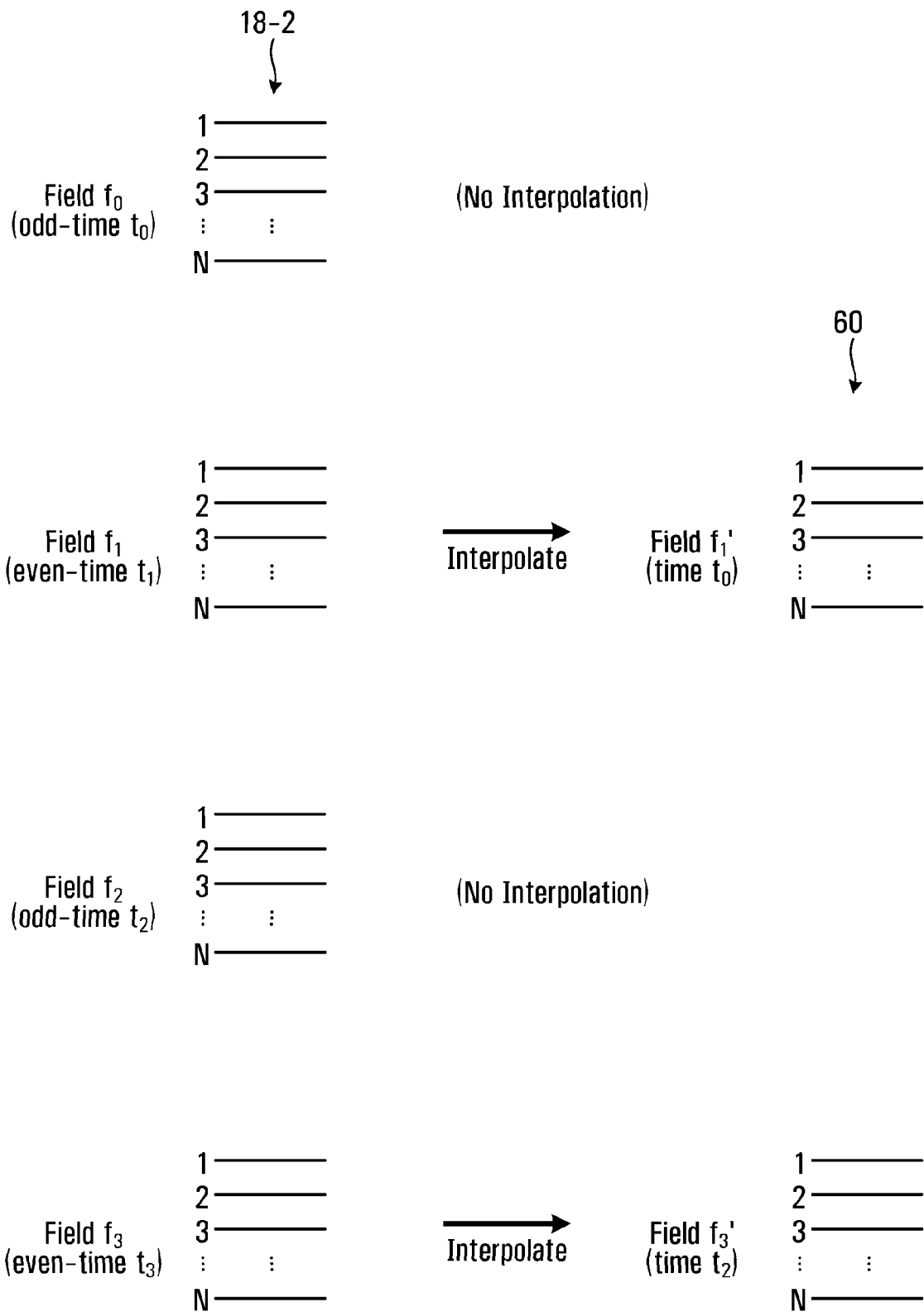
FIG. 6 illustrates, in part, the exemplary temporal interpolation video processing performed by the block of FIG. 5.
Figure 7:
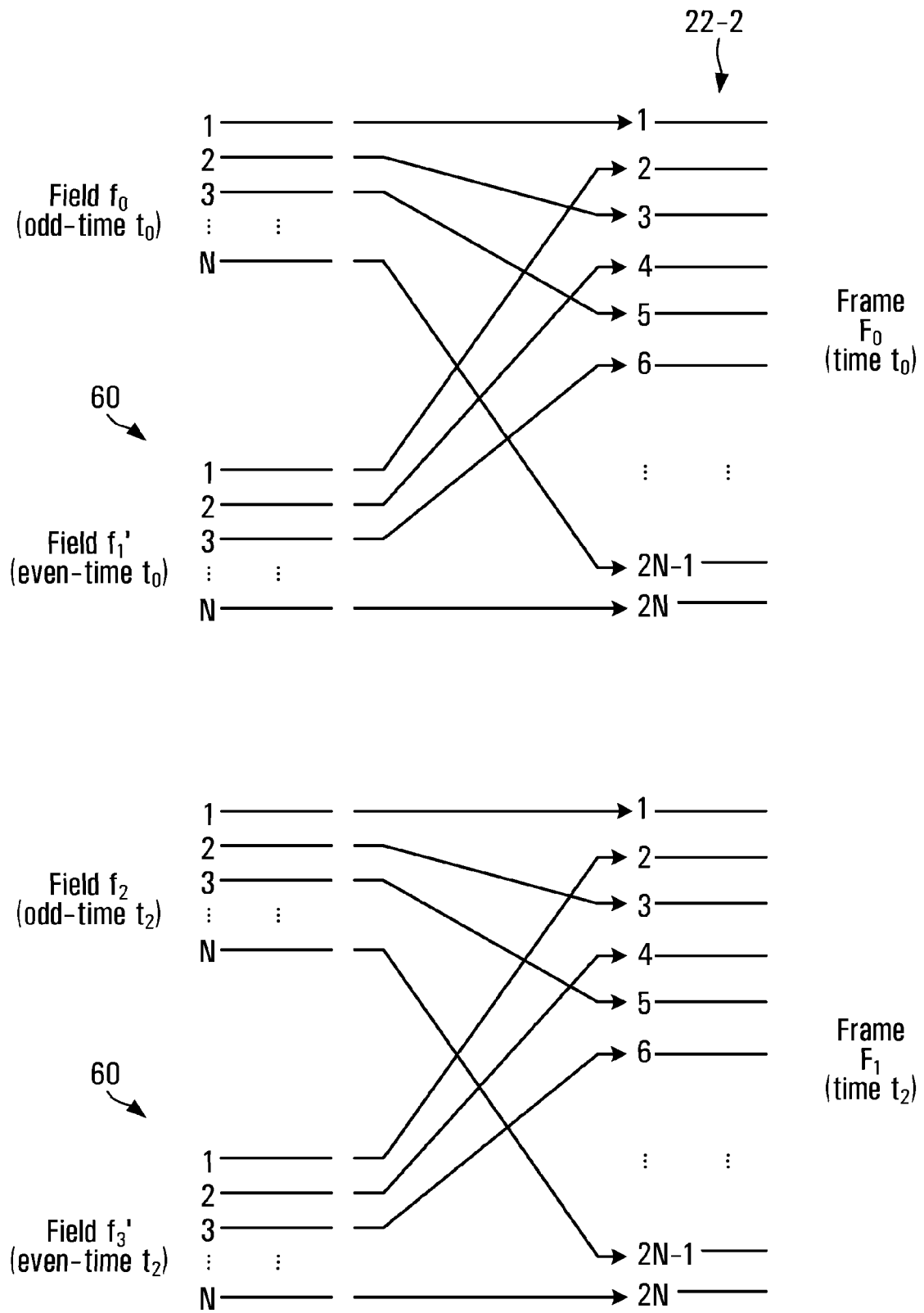
FIG. 7 illustrates, in further part, the exemplary temporal interpolation video processing performed by the block of FIG. 5.

FIG. 6 illustrates, in part, the exemplary temporal interpolation video processing performed by the de-interlacer 20-2 of FIG. 5. FIG. 7 illustrates, in further part, the exemplary temporal interpolation video processing performed by the de-interlacer 20-2 of FIG. 5. These figures are described below in conjunction with the description of operation of the system 10, which follows.

Figure 8:
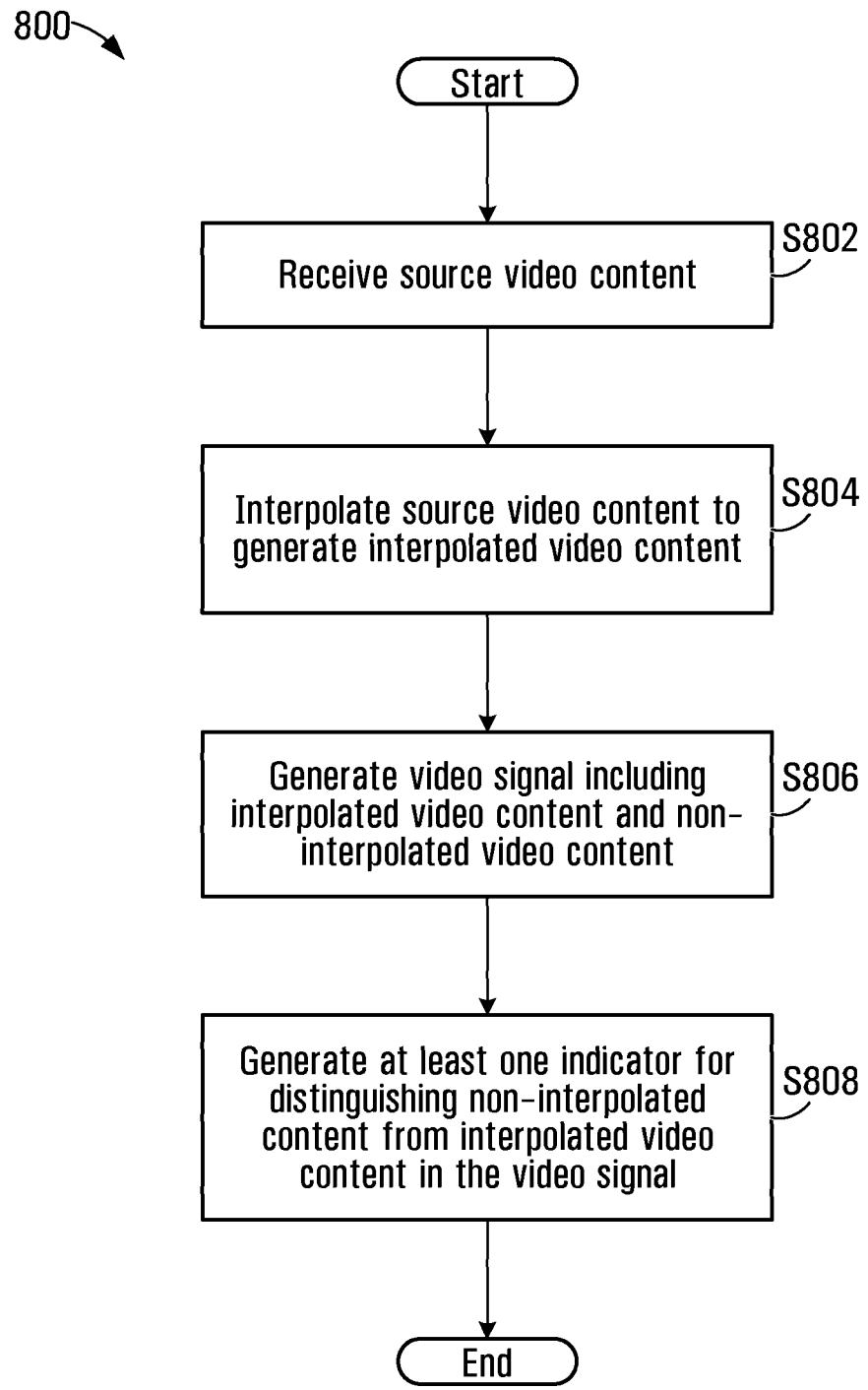
FIG. 8 is a flowchart illustrating operation of the video source device of FIG. 1.
Figure 9:
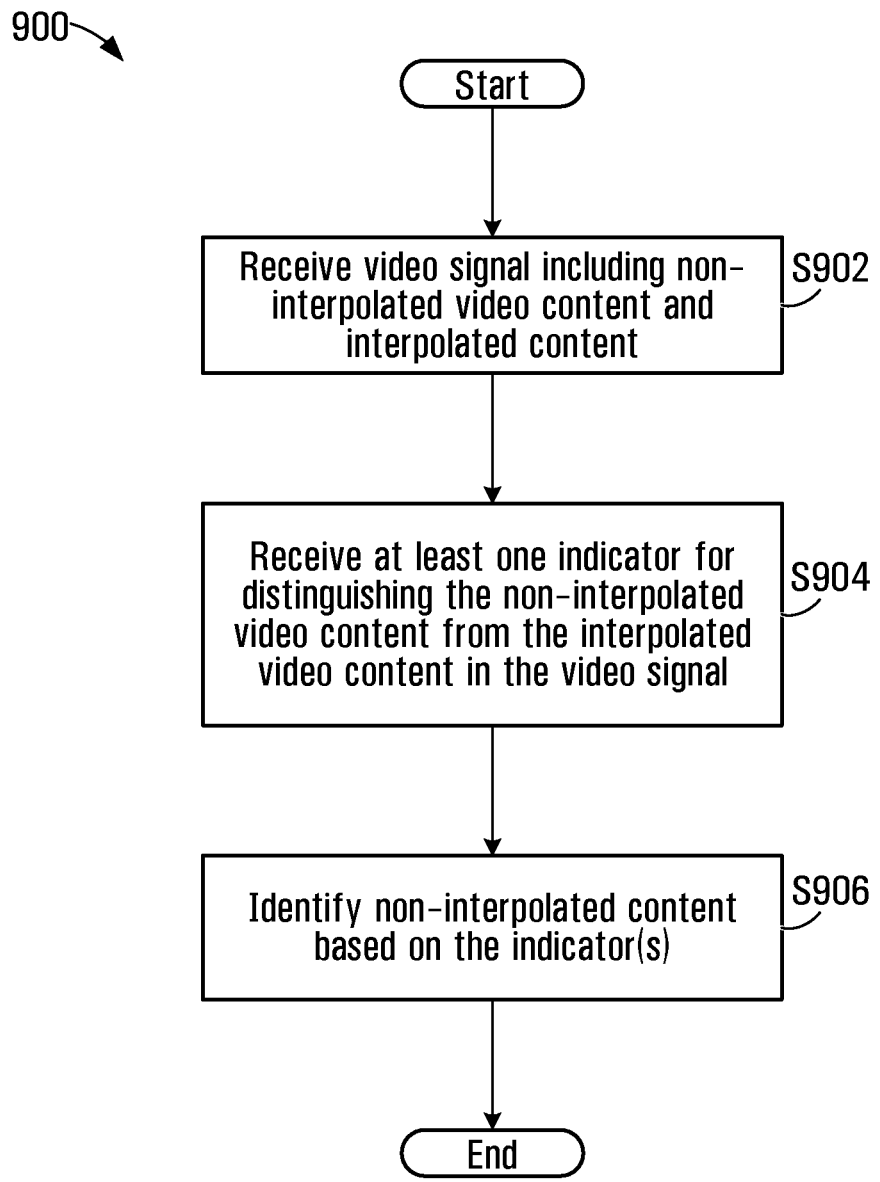
FIG. 9 is a flowchart illustrating operation of the video sink device of FIG. 1.

Operation of the system 10 of FIG. 1 is illustrated in FIGS. 8 and 9, with further reference to FIGS. 1-7. FIG. 8 illustrates the operation 800 of the video source device 12 while FIG. 9 illustrates the complementary operation 900 of video sink device 14.

The operation of FIGS. 8 and 9 is initially described for a system 10 in which the temporal interpolation video processing blocks 20 and 30 each comprise a frame rate converter. More specifically, block 20 of video source device 12 comprises the FRC 20-1 of FIG. 2, while block 30 of video sink device 14 comprises a similar frame rate converter (not expressly illustrated).

Referring to FIG. 8, initially source video content 18-1 is received (S802) by FRC 20-1 and stored in buffer 40 (FIG. 2). The precise manner in which the source video content 18-1 is "received" depends upon the nature of the video source device 12 in question. For example, if the device 12 is a DVD-Video player, "receiving" may require reading a DVD and decoding the video frames, whereas if the device 12 is a set-top box, it may require isolating a channel from numerous channels within a modulated RF signal from a cable provider, demodulating the channel and decoding video frames. The decoder that decodes the content may take the form of a conventional video decoder, compliant with any one of a number of video encoding/compression standards, such as MPEG, MPEG 2, MPEG 4, divX, ITU Recommendation ITU-H.264, HDMI™, ATSC, PAL or NTSC television, digital video (e.g. ITU BT.601) or the like. An exemplary video decoder 12 may include a parser for parsing the received video stream, an entropy (e.g. variable length) decoder, a motion compensation block, a run length decoder and inverse quantization block 36, an inverse transform block, a picture reconstruction block and memory for storing frames/fields, as found in conventional MPEG decoders and known to those of ordinary skill. The specific format of the source video content 18-1 (e.g. horizontal and vertical resolution, aspect ratio, and color format) may be dictated by the manner in which the video was encoded.

FIG. 3 illustrates an exemplary source frame sequence comprising exemplary source video content 18-1 received by video source device 12, in the form of a motion graph. In FIG. 3, the vertical axis of the graph represents motion and the horizontal axis represents time. Frames comprising source video content 18-1 are denoted using an uppercase "S", e.g., $S_0, S_1, S_2$, etc., while original film frames (from which the source frames were telecine converted) are denoted using an uppercase "O", e.g., $O_0, O_1, O_2$, etc. Thus, in FIG. 3, a 24 frame-per-second (fps) film having original frames $O_0, O_1, O_2, O_3$ etc. has been converted to telecine format and decoded and/or reconstructed by a video decoder upstream of FRC 20-1 as source frames $\{S_0, S_1, S_2, S_3, S_4, S_5, S_6, S_7, S_8, S_9,$ etc.$\}$ (at 60 fps) corresponding to original frames $\{O_0, O_0, O_0, O_1, O_1, O_2, O_2, O_2, O_3, O_3,$ etc.$\}$. Specifically, each second original film frame is sampled twice, while every other second original film frame is sampled three times. The resulting frames $S_0, S_1, S_2, S_3$ exhibit the 3:2 pull-down pattern familiar to those of skill in the art. The frame sequence exhibits jerky motion (known as "judder"), with motion only after the 3rd, 5th, 8th, 10th, etc. frame (i.e. $S_2$, $S_4$, $S_7$, $S_9$, etc., assuming "$S_0$" is the first frame).

The presence of the 3:2 pull-down pattern may be detected through comparison of the contents of adjacent source frames in buffer 40 for a sequence of frames. For example, comparing the most recently buffered frame in buffer 40 (i.e. $S_{i+3}$) with its immediate neighbor (i.e. $S_{i+2}$) over multiple decoded frames reveals a pattern of frame similarities/differences in adjacent frames. For instance, denoting frame differences with H, and similarities with L, a cadence detector may recognize the 3:2 pull-down pattern by detecting the HLHLLHLHLLHLH . . . difference pattern in adjacent source frames.

Next, the functional block 20 of video source device 12 applies temporal interpolation video processing to generate temporally interpolated video content (S804, FIG. 8), and combines that temporally interpolated video content with select source video content 18-1 to generate a rate converted output frame sequence 22-1 (S806). This is illustrated in FIG. 4. The purpose of the temporal interpolation video processing in the depicted embodiment is to frame-rate convert the video so as produce relatively smooth motion in which perceptible judder is removed or reduced.

As shown in FIG. 4, the frames in the output frame sequence 22-1 generated by FRC 20-1 are referred using a lowercase "f" as frames $f_0$, $f_1$, $f_2$ . . . etc. Source video frames 18-1 are indicated along the dotted line, while the output frame sequence 22-1 is indicated along the solid line. Frames which form part of the source video content 18-1 are represented by a circle, while temporally interpolated frames are represented as triangles. Other conventions are the same as in FIG. 3.

Based on the cadence information (i.e. the identified 3:2 pulldown pattern), the interpolator 42 of FRC 20-1 identifies unique frames in the source video content 18-1 for use as the basis for temporal interpolation. Interpolator 42 thereafter uses conventional motion compensation techniques upon these distinct frames in order to produce frames for presentation at double the input frame rate. Motion compensation/interpolation techniques that may be performed by interpolator 42 are generally discussed in Keith Jack, Video, 2005, Demystified (A handbook for the Digital Engineer), 4th ed., and Watkinson, John, The Engineer's Guide to Standards Conversion, Snell and Wilcox Handbook Series www.snell-wilcox.com/community/knowledge_center/engineering/estandard.pdf), the contents of both of which are hereby incorporated by reference. Interpolator 42 could alternatively use motion compensation techniques that are not necessarily conventional.

The output sequence of video frames that is generated by interpolator 42 is partly made up of non-temporally-interpolated video content (the source video content) and partly made up of temporally interpolated video content. Specifically, each output frame $f_j$ is either identical to a source frame $S_i$ or is formed using temporal interpolation upon at least two adjacent original frames identified within the source frame sequence (e.g. $O_i$, $O_{i+1}$). In the interpolated frames, motion may be linearly interpolated, with equal motion between each of frames $f_0$, $f_1$, $f_2$, $f_3$, and so on. Thus, as shown in FIG. 4, $f_0 = S_1$, while $f_1$, $f_2$, $f_3$, and $f_4$ are derived from an interpolation of $S_0$ (or equivalent frames $S_1$ or $S_2$) and $S_3$ (i.e. original film frames $O_0$ and $O_1$). Each interpolated frame $f_1$, $f_2$, $f_3$, and $f_4$ advances motion from $S_0$ to $S_3$ (i.e. from original film frame $O_0$ to original film frame $O_1$). Output frame $f_5$ is original film frame $O_1$ (i.e. source frame $S_3/S_4$). Output frames $f_6$, and $f_7$ are similarly derived from source frames $S_3/S_4$ and $S_5$ (corresponding to original film frames $O_1$ and $O_2$). Alternatively, motion may be interpolated non-linearly.

In the depicted embodiment (i.e. 3:2 pull-down pattern, frequency scaling of two), ten output frames are produced for every five (3+2) buffered frames. This is apparent in FIG. 4. Resulting frames $f_0$, $f_1$, $f_2$, $f_3$, $f_4$, $f_5$ . . . $f_{10}$ correspond to $O_0$, I{$O_0$,$O_1$,⅕}, I{$O_0$,$O_1$,⅖}, I{$O_0$,$O_1$,⅗}, I{$O_0$,$O_1$,⅘}, $O_1$, I{$O_1$,$O_2$,⅕}, I{$O_1$,$O_2$,⅖}, I{$O_1$,$O_2$,⅗}, I{$O_1$,$O_2$,⅘}, $O_2$. In the preceding notation, interpolated frames are denoted as I{$O_j$, $O_j+1$, 1/m}. This notation signifies a resulting motion interpolated frame that represents an intermediate frame between the original film frames $O_j$, $O_j+1$, interpolated to represent fractional 1/m motion from $O_j$ to $O_{j+1}$. For example, an interpolated frame I{$O_j$, $O_j+1$, ½}, is a frame formed to represent motion halfway between $O_j$ and $O_{j+1}$.

It will be appreciated that the degree of interpolation between decoded/processed frames, as well as which frames are to be interpolated by interpolator 42, is dependent on the cadence of the decoded/processed video frames F. For example, in the presence of 3:2 pull-down pattern and frequency scaling ratio of two, interpolator 42 causes motion in each interpolated frames to advance in fractional fifths of the source frames; in the presence of 2:2 pull-down, in fractional fourths; and in the presence of no pull-down, in fractional halves. Of course, if the cadence of the source frames S varies, the location of original frames O in buffer 40 will also vary.

In addition to generating the output frame sequence 22-1, the interpolator 42 also generates indicators 24-1 for distinguishing the non-temporally-interpolated video content from the temporally interpolated video content within that sequence (S808, FIG. 8). The indicators 24-1 may for example identify each output video frame that is anything other than a source video frame $S_n$ (exemplary source frames being identifiable in FIG. 4 as marked with an asterisk). Conversely, the indicators may identify the non-temporally-interpolated video content, e.g. each output video frame $f_n$ that is identical to a source video frame $S_n$ (such as the frames identified with an asterisk in FIG. 4), with the understanding that all other frames represent temporally interpolated video content. The generation of the indicators 24-1 may be referred to as "tagging" frames for later distinguishing of non-temporally-interpolated frames from temporally interpolated frames. The indicators 24-1 may be formatted in a suitable format for encoding over interconnection 16. The indicators may for example be packetized, with each packet containing binary or text data or being formatted using a markup language such as XML. Alternatively, the indicators 24-1 could be formatted in accordance with ITU Recommendation ITU-R BT.1364-1, or in other ways. The indicators 24-1 may be encoded within an auxiliary or "side" channel of interconnection 16 (e.g. in accordance with the above examples), e.g. such that the encoded data remains synchronized with frames 22-1 output by video source device 12, which may be carried over a different channel. Alternatively, the indicators 24-1 may be sent in-band with video data being communicated over the interconnection 16, e.g. multiplexed with output frame sequence 22-1 or other data, to occupy unused portions of the video signal (e.g. vertical blank or horizontal blank intervals), or the like, that is output by video source device 12 to video sink device 14. The output frame sequence 22-1 and indicators 24-1 may thus both be carried in a common video signal. The specific approach for achieving in-band embedding of indicators 24 may depend upon the operative video interconnect standard governing the interconnection 16 (if any). For example, in embodiments whose interconnection to the HDMI™ standard or the Consumer Electronics Association CEA 861 standard (Rev. D), the indication 70 could be embedded in one or more secondary data packets, referred to as "Info Frames" or "Info Packets", in the main channel of communication The output frame sequence 22-1 is transmitted with the indicators 24-1 over interconnection 16. Transmission over interconnection 16 may be by way of a video interface transmitter component (not illustrated), which may receive the output frame sequence 22-1 and indicators 24-1 and encode them into a suitable format for transmission across the interconnection 16. The specific format of the encoded video data and indicators may depend upon the video interconnect standard operative on the interconnection 16 between the devices 12 and 14 (if any). For example, if operative video interconnect standard is DVI or HDMI™, the Transmission Minimized Differential Signaling (TMDS) protocol may be used. Other protocols may be used in alternative embodiments. Operation 800 may continue for some time.

Turning to FIG. 9, the video sink device 14 receives encoded frame sequence 22-1 and indicators 24-1 (S902, S904). Receipt may be by way of a video interface receiver (not expressly illustrated) whose function is complementary to the function of the video interface transmitter (if any) of the video source device 12. The frame sequence 22-1 and indicators 24-1 are decoded. Thereafter, the indicators 24-1 are used to distinguish the non-temporally-interpolated video content from the temporally interpolated video content within the frame sequence 22-1 (S906). More specifically, the source video content within the frame sequence 22-1 is identified in the present embodiment. The manner in which this is done depends largely on the manner in which the indicators are represented. For example, if each indicator arrives in a packet that is synchronized with a video frame representing source video content (i.e. a frame marked with an asterisk in FIG. 4), then the distinguishing simply entail identifying the corresponding source video frame in the frame sequence 22-1. The identification may be performed by the temporal interpolation video processing block 30.

Once the source video content within the frame sequence 22-1 has been identified, the temporal interpolation video processing functional block 30 of the present embodiment may use the source video content to "redo" the temporal interpolation video processing performed video source device 12. The resulting temporally interpolated video content should be superior to that received from video source device 12, by virtue of the superior temporal interpolation video processing capability of functional block 30 in comparison to block 20. The new temporally interpolated video content may be substituted for the temporally interpolated video content received from video source device 12. Advantageously, the quality of the resulting video signal may be improved in comparison to the quality of the video signal output by the video source device 12. The resulting video signal may be passed to downstream components and is ultimately displayed or may be recorded.

In an alternative embodiment, rather than "redoing" the temporal interpolation video processing performed upstream, the video sink device 14 may simply "undo" the temporal interpolation video processing by disregarding the temporally interpolated video content. The non-temporally-interpolated video content may thereafter be recorded onto a storage medium, such as a memory, hard drive or recordable optical disk, for possible future use. Alternatively, it could be displayed.

The operation of FIGS. 8 and 9 shall now be described for an alternative system 10 in which the temporal interpolation video processing blocks 20 and 30 each comprise a de-interlacer. More specifically, block 20 comprises the de-interlacer 20-2 of FIG. 5, while block 30 of video sink device 14 comprises a similar de-interlacer (not expressly illustrated).

Referring to FIG. 8, the source video content 18-2 is initially received (S802), as described above. In this case, the content 18-2 is a sequence of video fields. Four exemplary fields $f_0$, $f_1$, $f_2$ and $f_3$, representing four different moments in time $t_0$, $t_1$, $t_2$, and $t_3$, are illustrated in FIG. 6, on the left hand side. Fields $f_0$ and $f_2$ are odd fields while fields $f_1$ and $f_3$ are even fields. The de-interlacer 20-2 performs temporal interpolation video processing to generate temporally interpolated video content (S804). As shown in FIG. 6, this is only done for only the even fields. In particular, the even fields are temporally interpolated "backwards in time" to the same point in time as the preceding odd field. For example, field $f_1$, which represents time $t_1$, is interpolated backwards to time $t_0$, resulting in temporally interpolated field $f_1'$; and field $f_3$, which represents time $t_3$, is interpolated backwards to time $t_2$, resulting in temporally interpolated field $f_1'$. The reason that temporal interpolation is only done for every other field is so that adjacent odd and even fields will represent the same moment in time, such that when the fields are combined during de-interlacing, such effects as "combing" will not occur. Of course, it would also possible for odd fields to be shifted in time instead of the even fields, or for the temporal interpolation to shift the fields forward in time rather than backwards in time. Moreover, it may be desirable to shift both of the even fields and the odd fields backward in time (or forward in time) to avoid regularly discarding the even field or the odd field, as will described below. Further, it will be appreciated that the temporal interpolation requires the use of two or more fields representing different points in time to establish movement "trends".

Thereafter, the temporally interpolated video content is combined with select source video content 18-2 (S806) to generate an output frame sequence 22-2, as illustrated in FIG. 7. In particular, the N lines of each original odd field are combined with the N lines of the adjacent, temporally interpolated even field, to create a frame containing 2N lines, which is output as video signal 22-2 (FIG. 5). For example, fields $f_0$ and $f_1'$ are combined to create frame $F_0$ (representing time $t_0$), while fields $f_2$ and $f_3'$ are combined to create frame $F_1$ (representing time $t_2$).

The de-interlacer 20-2 also generates indicators 24-2 for distinguishing the non-temporally-interpolated video content from the temporally interpolated video content in the generated sequence (S808, FIG. 8). The indicators 24-2 may for example indicate that, in each frame of the video signal generated by video source device 12, odd lines represent source content while even lines represent temporally interpolated video content. To the extent that this pattern does not change in the generated sequence, it may be unnecessary to send more than one indicator 24-2 along with the video signal 22-2 (or it may be sufficient to send an indicator to that effect less frequently than with every output frame). The indicator(s) 24-2 may be formatted and/or communicated using similar mechanisms as indicators 24-1, described above.

Thereafter, the temporally interpolated video content is combined with select source video content 18-2 (S806) to generate an output frame sequence 22-2, as illustrated in FIG. 7. In particular, the N lines of each original odd field are combined with the N lines of the adjacent, temporally interpolated even field, to create a frame containing 2N lines, which is output as video signal 22-2 (FIG. 5). For example, fields $f_0$ and $f_1'$ are combined to create frame $F_0$ (representing time $t_0$), while fields $f_2$ and $f_3'$ are combined to create frame $F_1$ (representing time $t_2$).

In the above-noted example, the N lines of each original odd field were combined with the N lines of the adjacent even field interpolated back in time to represent the same moment in time as that of the odd field, to create a sequence of frames, each containing 2N lines. Each resulting frame corresponds to the time of the original odd field whose lines form part of the frame, with the output frame rate thus being one-half of the input field rate. In that approach, while the odd fields are output in their original form, the even fields are only output in a temporally interpolated form (i.e. having been interpolated back in time). The failure to output any of the even fields in their original form could be considered an undesirable loss of information for some applications or in some contexts. Accordingly, as noted above, in some embodiments it may be desirable to shift both of the even fields and the odd fields backward in time. This is illustrated in FIG. 10.

Figure 10:
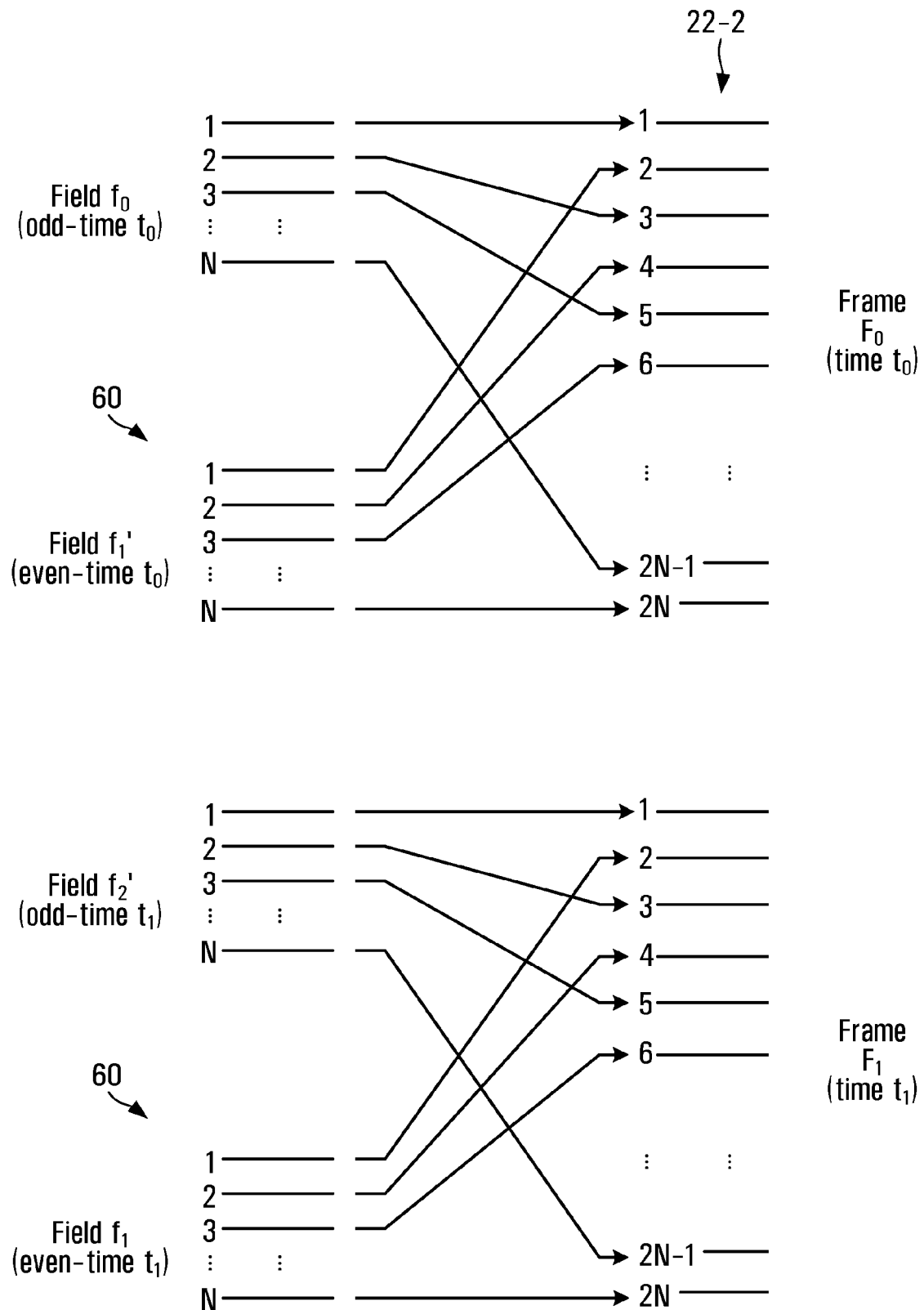
FIG. 10 illustrates, in further part, alternative exemplary temporal interpolation video processing that may be performed by the block of FIG. 5.

FIG. 10 illustrates exemplary temporal interpolation video processing that could be performed by the de-interlacer 20-2 of FIG. 5 of an alternative embodiment, in which all of the received fields (both odd and even) are output as part of an output frame. The upper portion of FIG. 10 shows the generation of frame $F_0$ representing time $t_0$. This portion of FIG. 10 is identical to the upper portion of FIG. 7. The lower portion of FIG. 10 shows the generation of frame $F_1$. This portion illustrates a different composition of frame $F_1$ as compared to that shown in the lower portion of FIG. 7. The odd field comprising the frame is not an original odd field, but rather is odd field $f_2'$, i.e. odd field $f_2$ having been interpolated back in time from time $t_2$ to time $t_1$. This illustrates the fact that, in this embodiment, even odd fields are temporally interpolated (in this case, back in time). Moreover, the even field of the lower portion of FIG. 10 is not an interpolated even field, but rather is an original even field $f_1$, also representing time $t_1$. The output frame $F_1$ accordingly represents time $t_1$. It will be appreciated that, using this approach, the original even fields are not "lost" (i.e. are not output solely in a temporally interpolated form) as in the embodiment of FIG. 7. Moreover, the output frame rate matches the input field rate rather than being half of the input field rate. In such an embodiment, the indicators 24-2 generated by de-interlacer 20-2 for distinguishing the non-temporally-interpolated video content from the temporally interpolated video content in the generated sequence (per S808, FIG. 8) will identify the odd field as the non-temporally interpolated content of frame $F_0$ of FIG. 10 and the even field as the non-temporally interpolated content of frame $F_1$ of FIG. 10. In other word, the indicators 24-2 will identify non-temporally interpolated content as alternating between the odd field and the even field of adjacent output frames. Accordingly, it may be desirable or necessary to output an indicator 24-2 for each output frame, each indicator indicating either that the odd field is the non-temporally interpolated field or that the even field is the non-temporally interpolated field (or, conversely, identifying the temporally interpolated field, rather than the non temporally interpolated field, in each output frame).

Referring to FIG. 9, the video sink device 14 receives frame sequence 22-2 and indicator(s) 24-2 (S902, S904). Thereafter, the indicator(s) 24-2 may be used to distinguish the non-temporally-interpolated video content from the temporally interpolated video content within the frame sequence 22-2 (S906). For example, based on the indicator(s) 24-2 as would be generated based on the operation shown in FIG. 7, the odd lines may be understood to represent source video content.

Once the source video content has been identified, functional block 30 may use that source video content to redo the temporal interpolation video processing performed video source device 12. For example, the temporally interpolated lines within each received video frame may be "overwritten" with newly generated lines that have been created (i.e. temporally interpolated) by functional block 30. The temporal interpolation might be based on the source video content within a number of preceding or subsequent frames. Alternatively, spatial interpolation might be used (at the possible expense of image quality). Advantageously, the quality of the resulting video signal may be improved, in comparison to the quality of the video signal output by the video source device 12. The resulting video signal is passed to downstream components (either within video sink device 14 or external to it) and is ultimately displayed.

It is noted generally that, when indicators 24 (FIG. 1) are encoded along with video signal 22 (FIG. 1) for transmission over a interconnection 16 conforming to a known video interconnect standard, it may be beneficial (although not required) to encode the indicators 24 so as not to impact upon the video data format that a downstream device conforming to the standard expects to receive. This is so that, if the downstream component is a legacy component that is not capable of utilizing, or does not even to expect to receive, indicators 24, it will still be able to use the video signal 22. This contributes to the backwards compatibility of the video source device 12 with older video source devices 14. Conversely, a component such as video sink device 14 that is capable of utilizing indicators 24 as described below may be made backwardly compatible with an older video source device 12 that does not generate such indicators simply making it capable of applying temporal interpolation video processing in a default manner (e.g. according to user preferences specified by way of an on-screen display configuration mechanism) when no indicators are received over the interconnection 16 between the devices.

In the above-described embodiments, the indicator(s) 24 are described as being communicated or "pushed" to video sink device 14 through synchronous (or asynchronous) communication. It some embodiments, they could be buffered at video source device 12, and may be extracted or "pulled" by video sink device 14 or some other component. Video source device 12 may accordingly include sufficient storage memory for storing attribute data and provide a suitable interface (such as a software application programmer interface (API)) for querying the data. Optionally video source device 12 may buffer the indicators 24 for, say, several frames. The indicators 24 may then be queried as required.

In the above-described embodiments, the interpolation that is performed is temporal interpolation. It will be appreciated that a similar strategy may be employed in systems performing spatial interpolation to identify non-spatially interpolated content comprising output frames or fields.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method comprising:
    interpolating source video content to create interpolated video content;
    generating a video signal including said interpolated video content and non-interpolated video content;
    generating at least one indicator for distinguishing the non-interpolated video content from the interpolated video content in said video signal; and transmitting, with the interpolated video content and the non-interpolated video content, the at least one indicator for distinguishing the non-interpolated video content from the interpolated video content in the generated video signal.

2. The method of claim 1 wherein said interpolating comprises spatially interpolating or temporally interpolating.

3. The method of claim 1 wherein said non-interpolated video content comprises said source video content or a processed form of said source video content.

4. The method of claim 1 wherein said at least one indicator identifies either said non-interpolated video content or said interpolated video content.

5. The method of claim 1 wherein said video signal comprises video frames, wherein said non-interpolated video content comprises a first subset of said video frames, and wherein said interpolated video content comprises a second subset of said video frames.

6. The method of claim 1 wherein said video signal comprises video frames, wherein said non-interpolated video content comprises one of even lines or odd lines of said video frames, and wherein said interpolated video content comprises the other of the even lines or the odd lines of said video frames.

7. The method of claim 1 wherein said interpolating comprises performing frame-rate conversion or de-interlacing video processing.

8. A method comprising, at a video sink device:
receiving a video signal comprising non-interpolated video content and interpolated video content;
receiving, with the non-interpolated video content and interpolated video content, at least one indicator for distinguishing the non-interpolated video content from the interpolated video content in said video signal; and
based on said at least one indicator, distinguishing the non-interpolated video content from the interpolated video content in said video signal.

9. The method of claim 8 wherein said interpolated video content comprises spatially interpolated video content and said non-interpolated video content comprises non-spatially-interpolated video content, or wherein said interpolated video content comprises temporally interpolated video content and said non-interpolated video content comprises non-temporally-interpolated video content.

10. The method of claim 8 further comprising recording the non-interpolated video content, but not the interpolated video content, to a storage medium.

11. The method of claim 8 further comprising interpolating the non-interpolated video content to generate new interpolated video content.

12. The method of claim 11 further comprising replacing said interpolated video content with said new interpolated video content.

13. A non-transitory machine-readable medium storing instructions that, when executed by a processor of a video source device, causes said device to:
interpolate source video content to create interpolated video content;
generate a video signal including said interpolated video content and non-interpolated video content;
generate at least one indicator for distinguishing the non-interpolated video content from the interpolated video content in said video signal; and
transmit, with the interpolated video content and the non-interpolated video content, the at least one indicator for distinguishing the non-interpolated video content from the interpolated video content in the generated video signal.

14. The machine-readable medium of claim 13 wherein said non-interpolated video content comprises said source video content or a processed form of said source video content.

15. A non-transitory machine-readable medium storing instruction that, when executed by a processor of a video sink device, cause said device to:
receive a video signal comprising non-interpolated video content and interpolated video content;
receive, with the non-interpolated video content and interpolated video content, at least one indicator for distinguishing the non-interpolated video content from the interpolated video content in said video signal; and
based on said at least one indicator, distinguish the non-interpolated video content from the interpolated video content in said video signal.

16. The machine-readable medium of claim 15 wherein said instructions further cause said device to record the non-interpolated video content, but not the interpolated video content, to a storage medium.

17. The machine-readable medium of claim 15 wherein said instructions further cause said device to interpolate the non-interpolated video content to generate new interpolated video content.

18. The machine-readable medium of claim 17 wherein said instructions further cause said device to replace said interpolated video content with said new interpolated video content.

19. A video source device comprising a processor and memory storing instructions that, when executed by said processor, cause said device to:
interpolate source video content to create interpolated video content;
generate a video signal including said interpolated video content and non-interpolated video content;
generate at least one indicator for distinguishing the non-interpolated video content from the interpolated video content in said video signal; and
transmit, with the interpolated video content and the non-interpolated video content, the at least one indicator for distinguishing the non-interpolated video content from the interpolated video content in the generated video signal.

20. The device of claim 19 wherein said non-interpolated video content comprises said source video content or a processed form of said source video content.

21. A video sink device comprising a processor and memory storing instructions that, when executed by said processor, cause said device to:
receive a video signal comprising non-interpolated video content and interpolated video content;
receive, with the non-interpolated video content and interpolated video content, at least one indicator for distinguishing the non-interpolated video content from the interpolated video content in said video signal; and
based on said at least one indicator, distinguish the non-interpolated video content from the interpolated video content in said video signal.

22. The device of claim 21 wherein said instructions further cause said device to record the non-interpolated video content, but not the interpolated video content, to a storage medium.

23. The device of claim 21 wherein said instructions further cause said device to interpolate the non-interpolated video content to generate new interpolated video content.

24. The device of claim 23 wherein said instructions further cause said device to replace said interpolated video content with said new interpolated video content.

* * * * *